: 3,167,477
Patented Jan. 26, 1965

3,167,477
2,4-DIMETHYL-6-ACETOXY-M-DIOXANE AND 2,4-DIMETHYL - 6 - PROPIONYLOXY - M - DIOXANE PROCESS AND COMPOSITIONS FOR PRESERVING AQUEOUS COMPOSITIONS AGAINST SPOILAGE BY BACTERIA AND FUNGI
William S. Gump, Upper Montclair, and George R. Walter, Ho-Ho-Kus, N.J., assignors to The Givaudan Corporation, New York, N.Y., a corporation of New Jersey
No Drawing. Filed Dec. 5, 1962, Ser. No. 242,364
16 Claims. (Cl. 167—85)

The present invention relates to processes and compositions for imparting antibacterial and antifungal properties.

While the invention is applicable for many end uses, it is presently preferred to employ it for processes and compositions for combatting bacterial and fungal-caused spoilage in aqueous systems. For this reason, the invention will be explained in detail with this presently-preferred end use in mind. It is understood, however, that such exemplification is not to be considered as a limitation but only by way of illustration.

It is well known that many aqueous compositions are subject to a pronounced tendency to decompose and spoil through the action of bacteria and fungi. As a result of such decomposition, tremendous money losses are incurred as the compositions are often not suitable for their intended purposes, for various reasons, including the development of bad odors. Examples of such compositions include emulsions such as cosmetic compositions, e.g., lotions and creams, soaps and liquid detergents, eye lotions, milk, emulsion paints, emulsion waxes and cutting oils used as coolants for high speed machine tools; petroleum products such as jet fuel and fuel oil which acquire water due to condensation of moisture; industrial cooling water and water employed in connection with secondary recovery methods in oil producing operations.

We are aware that much time, thought and effort has been expended in order to overcome the aforementioned spoilage problem. Such efforts, while they have resulted in a number of useful preservatives having been recommended, still leave much to be desired. For example, compositions containing nonionic emulsifiers are not adequately protected by phenolic preservatives, due to inactivation of the phenols by the nonionic emulsifiers. While organic mercurials are useful in such cases, in low concentrations, they are disadvantageous because of their well-known toxicity.

We have tested scores of substituted dioxanes for the indicated purpose and, surprisingly, have only found two of them to have the requisite properties for use as preservatives for aqueous compositions which normally spoil due to the action of bacteria and fungi. That so few of the materials tested possess the desired properties is not surprising when one considers the ideal requirements which should be met. These requirements include:

(1) Effectiveness at very low concentrations.
(2) Non-toxic in the amounts employed.
(3) Effectiveness against the principal spoilage inducers, i.e., *Pseudomonas aeruginosa*, *Escherichia coli* and *Proteus vulgaris*.
(4) Miscibility with the organic solvents commonly employed in compositions subject to spoilage.
(5) Activity over a wide range of pH so as to lend itself to use with formulations of varied composition and pH.
(6) Stability.
(7) Freedom from objectionable odor.
(8) Reasonableness of cost.
(9) Effectiveness over the entire range of pH where spoilage has been found to occur, i.e., at a pH of 5 to 8.

In accordance with this invention, the two preservatives which have surprisingly satisfied the noted requirements are 2,4-dimethyl-6-acetoxy-m-dioxane and 2,4-dimethyl-6-propionyloxy-m-dioxane. Even the closely-related 2,4-dimethyl-6-butyryloxy-m-dioxane has been found unsuitable as a practical preservative on account of its objectionable odor.

The aforementioned acetoxy and propionyloxy compounds which we have found to be suitable in accordance with this invention are not novel compounds. A method for their preparation and their physical properties are described by H. Uelzmann in Chem. Ber. 87, 1162 (1954). However, so far as we are aware, no practical or commercial use of these compounds, prior to our present invention, has ever been made. Accordingly, these compounds are not staple articles or commodities of commerce in the United States of America, or elsewhere, so far as we know.

While, as aforesaid, the two preservatives of this invention are not novel with us, it is pertinent to note here that they are both liquids slightly soluble in water, and miscible with the common organic solvents such as acetone, ethanol, isopropanol, propylene glycol, ethyl ether, benzene, toluene and carbon tetrachloride.

The minimum concentrations of 2,4-dimethyl-6-acetoxy-m-dioxane, inhibiting various organisms in conventional microbiological tests, is shown below.

| Organism: | M.I.C. ($\mu$g./ml.)[1] |
|---|---|
| *Staphylococcus aureus* | 1250 |
| *Bacillus subtilis* | 625 |
| *Pseudomonas aeruginosa* | 625 |
| *Pseudomanas fluorescens* | 625 |
| *Bacterium ammoniagenes* | 625 |
| *Escherichia coli* | 625 |
| *Aerobacter aerogenes* | 625 |
| *Salmonella typhosa* | 625 |
| *Salmonella choleraesuis* | 312 |
| *Shigella sonnei* | 625 |
| *Saccharomyces cerevisiae* | 2500 |
| *Pityrosporum ovale* | 625 |
| *Candida albicans* | 1250 |
| *Aspergillus niger* | 1250 |
| *Aspergillus flavus* | 1250 |
| *Aspergillus terreus* | 1250 |
| *Aspergillus oryzae* | 1250 |
| *Penicillium piscarium* | 625 |
| *Penicillium species* (unknown) | 1250 |

[1] Minimal inhibitory concentration in $\mu$g./ml. agar by twofold serial dilution technique. Bacteria on dextrose tryptone extract agar, 3 days at 34° C. Molds and yeasts on Sabouraud's dextrose 5 days at 30° C.

Minor amounts of the preservatives are sufficient to combat spoilage caused by bacteria or fungi. Amounts as low as from about 0.1 to about 0.2% by weight of the total composition have given satisfactory results. If desired, even lower amounts may be used in some cases. The use of much greater amounts, while feasible from the technical standpoint, is not recommended as a practical matter mainly because it adds to the cost of preserving the compositions.

This invention may be practiced by adding the preservatives to the compositions in any suitable manner. For example, the incorporation can be effected either during the preparation of the composition or after the composition has been prepared. It is sufficient that the preservatives be homogeneously distributed throughout the composition. Addition of the preservatives is most conveniently done, in the case of cosmetic lotions, by dissolving the preservatives in the oil phase before emulsification to yield the final product, or by adding them directly to the emulsified final product.

The method employed (except for Example III) to test the preserving properties of compositions under consideration is as follows:

Fifty gram samples were inoculated with 0.05 ml. of a 24 hour broth culture of *Pseudomonas aeruginosa* which results in the samples having an initial bacterial count of approximately one million per gram. The inoculated samples were then held at 30° C. and bacterial counts made at varying time intervals, usually at 24 and 72 hours after inoculation employing dextrose tryptone extract agar containing 0.001% triphenyltetrazolium chloride. Plates were counted at the end of 48 hours' incubation at 37° C. in which case the percentage survivors may be calculated if desired.

EXAMPLE I

To illustrate the effectiveness of 2,4-dimethyl-6-propionyloxy-m-dioxane in nonionic lotions, different formulations containing 0.1% 2,4-dimethyl-6-propionyloxy-m-dioxane (IA, IIA and IIIA), 0.1% methyl p-hydroxybenzoate (IB, IIB, and IIIB) were compared to the inhibitory properties of the lotions containing no added preservative (IC, IIC and IIIC).

The compositions of the lotions IA, IIA and IIIA were as follows:

*Formula IA*

| | Parts by weight |
|---|---|
| Petrolatum | 7.5 |
| Mineral oil | 37.5 |
| Beeswax | 2.0 |
| Atlas G–1425 (polyoxyethylene sorbitol lanolin derivative) | 4.5 |
| Arlacel #83 (sorbitan sesquioleate) | 2.0 |
| 2,4-dimethyl-6-propionyloxy-m-dioxane | 0.1 |
| Water | 46.4 |

In preparing the composition IA, all of the ingredients, except the preservative 2,4-dimethyl-6-propionyloxy-m-dioxane and water were heated together to 75° C. (Phase 1) and the remaining aforementioned two ingredients were heated together to 77° C. (Phase 2). The latter phase was then added to the former slowly with stirring, which was continued until the preparation reached room temperature (25° C.).

*Formula IIA*

| | Parts by weight |
|---|---|
| Mineral oil | 35.0 |
| Lanolin | 1.0 |
| Cetyl alcohol | 1.0 |
| Arlacel #80 (sorbitan monooleate) | 2.1 |
| Tween #80 (polyoxethylene sorbitan oleate) | 4.9 |
| 2,4-dimethyl-6-propionyloxy-m-dioxane | 0.1 |
| Water | 55.9 |

This composition was prepared in a manner similar to that in which IA was prepared. The first phase comprised all of the ingredients except the preservative and water; the second phase comprised the preservative and water. Phase 1 was heated to 60° C. and phase 2 was heated to 62° C. The second phase was added to the first phase slowly with stirring, which was continued until the preparation reached room temperature (25° C.).

*Formula IIIA*

| | Parts by weight |
|---|---|
| Mineral oil | 25.0 |
| Arlacel #60 (sorbitan monostearate) | 4.0 |
| Tween #60 (polyoxyethylene sorbitan monostearate) | 6.0 |
| Giv-Tan F (2-ethoxyethyl p-methoxycinnamate) | 1.5 |
| 2,4-dimethyl-6-propionyloxy-m-dioxane | 0.1 |
| Water | 63.4 |

This composition was prepared as follows: the first three ingredients comprised Phase 1; the 2-ethoxyethyl p-methoxycinnamate comprised Phase 2; and the preservative and water comprised Phase 3. Phase 1 was heated to 55° C.; Phase 3 was heated to 60° C. Phase 3 was added to Phase 1 slowly with stirring. Stirring was continued and the preparation was permitted to cool. When the temperature of the mixture had reached 50° C., Phase 2 was added thereto. Stirring was continued until the temperature reached room temperature (25° C.).

Lotions having the same compositions as IA, IIA and IIIA, except that methyl p-hydroxybenzoate was used in place of the 2,4-dimethyl-6-propionyloxy-m-dioxane, were prepared and designated as IB, IIB and IIIB, respectively. Lotions having the same compositions as IA, IIA and IIIA except that the 2,4-dimethyl-6-propionyloxy-m-dioxane was omitted were also prepared, and these latter lotions were designated as IC, IIC and IIIC respectively.

The preservation of the lotions designated IA, IIA, IIIA, IB, IIB, IIIB, IC, IIC, and IIIC was tested in accordance with the aforementioned procedure. The results are tabulated below:

| Lotion No. | Counts per gram at— | | |
|---|---|---|---|
| | 0 hr. | 24 hr. | 72 hr. |
| IA | 740×10⁴ | <100 | <100 |
| B | 100×10⁴ | 240×10⁵ | 520×10³ |
| C | 380×10⁴ | >300×10⁵ | >300×10⁵ |
| IIA | 150×10⁴ | <100 | <100 |
| B | 240×10⁴ | <100 | 960×10³ |
| C | 390×10⁴ | >300×10⁵ | >300×10⁵ |
| IIIA | 130×10³ | <100 | <100 |
| B | 300×10⁴ | 590×10³ | 310×10⁴ |
| C | 265×10⁴ | >300×10⁵ | >300×10⁵ |

The tabulated results clearly show the inhibitory effect of 2,4-dimethyl-6-propionyloxy-m-dioxane and the superiority of the latter over methyl p-hydroxybenzoate.

Substantially the same results as given in the foregoing table were obtained when 2,4-dimethyl-6-acetoxy-m-dioxane was used in place of 2,4-dimethyl-6-propionyloxy-m-dioxane.

EXAMPLE II

A lotion formulated with anionic emulsifiers will be protected from degradation by bacteria and fungi through the addition of 0.1% to 0.2% of 2,4-dimethyl-6-acetoxy-m-dioxane or 2,4-dimethyl-6-propionyloxy-m-dioxane. The following is an example of such a lotion.

*Phase 1*

| | Parts by weight |
|---|---|
| Diethylene glycol monostearate | 2.0 |
| Stearic acid, triple-pressed | 3.5 |
| Cetyl alcohol, N.F. | 0.4 |
| Isopropyl myristate | 4.0 |
| Triethanolamine | 1.0 |
| Triethanolamine laurylsulfate | 0.75 |
| Giv-Tan F (2-ethoxyethyl p-methoxycinnamate) | 1.5 |

*Phase 2*

| | |
|---|---|
| 2,4-dimethyl-6-propionyloxy-m-dioxane | 0.2 |
| Water | 86.65 |

Each phase was separately heated to 70° C. Phase 2 was then added to Phase 1 slowly with stirring. Stirring was continued until the preparation cooled to room temperature (25° C.).

The foregoing lotion was tested in accordance with the aforementioned procedure for its preservative properties and substantially the same preservation was obtained when 2,4-dimethyl-6-acetoxy-m-dioxane was substituted in the lotion of this example for the 2,4-dimethyl-6-propionyloxy-m-dioxane.

EXAMPLE III

Seven different substrates were inoculated with a mixed cell suspension of *Escherichia coli* and *Pseudomonas*

*aeruginosa* to give an initial total bacterial count of $75 \times 10^4$/ml. The inoculated substrates each contained 0.2% by weight of 2,4-dimethyl-6-acetoxy-m-dioxane. Survivor counts were made at the end of 24 hours and again at the end of 48 hours' incubation at 30° C. All counts were made employing dextrose tryptone extract agar by standard plate count technique.

The results are given in the following table:

| Substrate | A | | B | | C | | D | | E | | F | | G | |
|---|---|---|---|---|---|---|---|---|---|---|---|---|---|---|
| Percent 2,4-dimethyl-6-acetoxy-m-dioxane | 0 | .2 | 0 | .2 | 0 | .2 | 0 | .2 | 0 | .2 | 0 | .2 | 0 | .2 |
| Count/ml. after 24 hours at 30°C | >2000×10⁴ | <100 | >2000×10⁴ | 192×10² | >2000×10⁴ | 17×10⁴ | >2000×10⁴ | <100 | 950×10⁴ | <100 | >2000×10⁴ | <100 | >2000×10⁴ | <100 |
| Count/ml. after 48 hours at 30°C | >2000×10⁴ | >2000×10⁴ | >2000×10⁴ | <100 | >2000×10⁴ | <100 | >2000×10⁴ | <100 | >2000×10⁴ | <100 | >2000×10⁴ | <100 | >2000×10⁴ | <100 |

A = 1% glucose and 0.1% peptone in water.
B = Nutrient broth comprising 5 grams of peptone and 3 grams of beef extract in 1000 ml. of water, sold by Difco Laboratories, Detroit, Mich., in anhydrous form.
C = Same as B, plus 20% of rabbit serum.
D = Soluble cutting oil emulsion (Kutwell, Humble Oil & Refining Company).
E = Nonionic lotion comprising:
   3 grams of stearic acid;
   5 grams of mineral oil;
   1.5 grams of sorbitol stearate (Arlacel 60, Atlas Powder Co.);
   3.5 grams of polyoxyethylene sorbitan monostearate (Tween 60, Atlas Powder Co.);
   87 grams of water.
F = Grade A pasteurized milk.
G = 0.5 gram of soil in 300 ml. of tap water, sterilized in a steam autoclave at 121° C. for 30 min, before inoculation.

Having in mind that a count of less than 100 denotes substantial absence of microorganisms such that the preservation of the product is assured, it is apparent that in all cases 0.2% of 2,4-dimethyl-6-acetoxy-m-dioxane gave substantially complete protection and preservation.

It is to be understood that the term "aqueous" as used herein to denote compositions which can be preserved in accordance with the present invention is used in a broad sense and is not limited to solutions but includes suspensions, emulsions and all compositions which contain water.

The present application is a continuation-in-part of our co-pending application, Serial No. 25,839, filed May 2, 1960, now abandoned.

The foregoing illustrates the practice of our invention, which, however, is not to be limited thereby but is to be construed as broadly as permissible in view of the prior art and limited solely by the appended claims.

We claim:

1. The process for combatting bacterial and fungal-caused spoilage of an aqueous composition normally subject to such spoilage, which comprises incorporating in such composition a minor amount of a member selected from the group consisting of 2,4-dimethyl-6-acetoxy-m-dioxane and 2,4-dimethyl-6-propionyloxy-m-dioxane.

2. The process of claim 1, wherein the composition is an emulsion.

3. The process of claim 2, wherein said amount is from about 0.1% to about 0.2% by weight of said composition.

4. The process of claim 2, wherein said composition is emulsified with a nonionic emulsifier.

5. The process of claim 2, wherein said member is 2,4-dimethyl-6-acetoxy-m-dioxane.

6. The process of claim 2, wherein said member is 2,4-dimethyl-6-propionoyloxy-m-dioxane.

7. The process for combatting bacteria and fungi-induced spoilage of a cosmetic composition containing a nonionic emulsifier and normally subject to such spoilage, which comprises incorporating in said composition a minor amount of 2,4-dimethyl-6-acetoxy-m-dioxane.

8. The process of claim 7, wherein 2,4-dimethyl-6-propionyloxy-m-dioxane is employed instead of 2,4-dimethyl-6-acetoxy-m-dioxane.

9. A composition resistant to spoilage by action of bacteria and fungi, which comprises an aqueous emulsion normally subject to such spoilage and a minor amount of a member selected from the group consisting of 2,4-dimethyl-6-acetoxy-m-dioxane and 2,4-dimethyl-6-propionyloxy-m-dioxane.

10. A composition as in claim 9, wherein said amount is from 0.1% to about 0.2% by weight of said composition.

11. A composition as in claim 9, wherein said member is 2,4-dimethyl-6-acetoxy-m-dioxane.

12. A composition as in claim 9, wherein said member is 2,4-dimethyl-6-propionyloxy-m-dioxane.

13. A composition as in claim 9, wherein said composition is emulsified with a nonionic emulsifier.

14. A composition as in claim 13, wherein said composition is a cosmetic composition.

15. A composition as in claim 14, which contains from about 0.1% to about 0.2% by weight of 2,4-dimethyl-6-acetoxy-m-dioxane.

16. A composition as in claim 14, which contains from about 0.1% to about 0.2% by weight of 2,4-dimethyl-6-propionyloxy-m-dioxane.

References Cited in the file of this patent

UNITED STATES PATENTS

| | | |
|---|---|---|
| 2,485,987 | Senkus | Oct. 25, 1949 |
| 2,510,036 | Mowry | May 30, 1950 |
| 2,882,275 | Meiser et al. | Apr. 14, 1959 |
| 2,903,464 | Werner | Sept. 8, 1959 |
| 2,994,706 | Rosen | Aug. 1, 1961 |
| 3,000,904 | Kundiger et al. | Sept. 19, 1961 |
| 3,036,904 | Chafetz et al. | May 29, 1962 |

OTHER REFERENCES

Uelzmann, Chem. Ber., vol. 87 (1954); pp. 1162–1163.

"Dioxanes as Disinfectants," Chem. Abstracts, vol. 54, No. 12, #12501d, June 25, 1960.